H. J. LEWIS.
STAND FOR CAMERAS, &c.

No. 23,428.  Patented Mar. 29, 1859.

Witnesses:
Lemuel W. Serrell
Thomas G. Harold

Inventor:
Henry J. Lewis

UNITED STATES PATENT OFFICE.

HENRY J. LEWIS, OF BROOKLYN, NEW YORK, ASSIGNOR TO HIMSELF, AND RICHD. A. LEWIS, OF NEW YORK, N. Y.

CAMERA-STAND.

Specification of Letters Patent No. 23,428, dated March 29, 1859.

*To all whom it may concern:*

Be it known that I, HENRY J. LEWIS, of Brooklyn, in the county of Kings and State of New York, have invented, made, and applied to use a certain new and useful Improvement in Stands for Cameras and other Optical Instruments; and I do hereby declare that the following is a full, clear, and exact description of the construction and operation of the same, reference being had to the annexed drawing, making a part of this specification, wherein—

Figure 2:
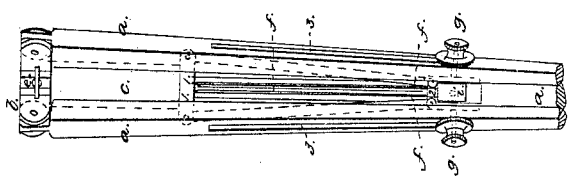
Figure 1:
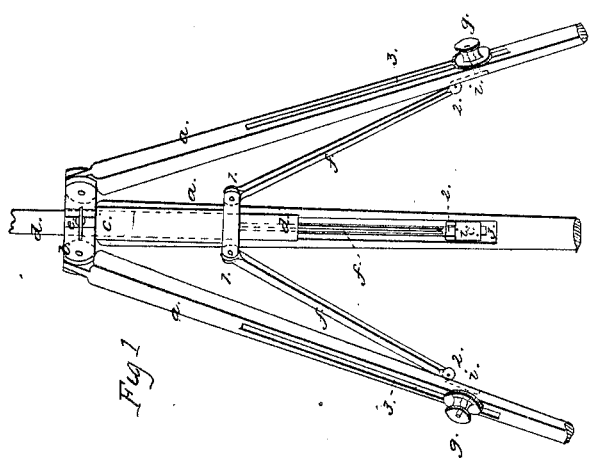
Figure 3:
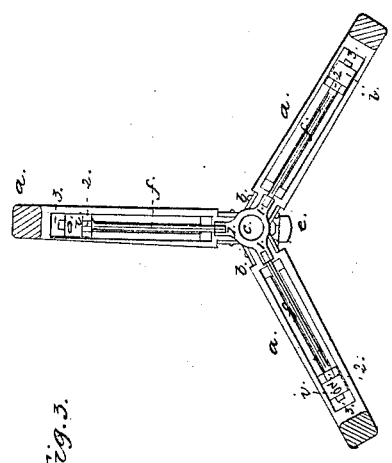

Figure 1, is a side elevation of the said stand with the legs partly broken off, and the parts distended ready for use; Fig. 2, is a similar elevation with the legs shut up for transportation; and Fig. 3, is an inverted plan of the said stand.

Similar marks of reference denote the same parts.

In stands for cameras and other instruments it is highly desirable to combine the features which will allow of easy transportation in a small compass, with a rigidity when in use so that there will be no liability for the stand to shake or slip when in use, and also that there will be no occasion to disconnect and remove the parts which always increases the liability of loss in transportation and increases the trouble consequent upon the use of such instruments.

The nature of my said invention consists in combining with a tripod, hinged braces so attached and sliding in slots in the said legs or tripod that the said legs are firmly held when distended, or can be shut up with ease, without detaching any of the parts.

In the drawing *a, a, a,* are legs, hinged onto the crown piece *b*. *c*, is a pipe formed with or attached to said crown piece *b*, and into this pipe or onto this crown piece the camera or other instrument is secured by a rod (*d,*) and clamping screw (*e,*) or other suitable device. The lower end of the pipe *c,* is formed with joints 1, 1, to which the braces *f, f, f,* are hinged; the other ends of these braces *f,* connect respectively to joints 2, 2, on sliding blocks *i, i, i,* that are fitted in grooves in the inner side of the legs (*a, a, a,*) and said legs are also provided with dots 3, 3, 3, through which the screws pass from the blocks *i, i, i,* and *g, g, g* are the nuts and washers on the outer sides of the legs by which the blocks *i, i, i,* are clamped firmly into place.

It will now be apparent that when the nuts *g g g* are loosened the blocks *i, i, i,* will slide freely and the legs can be opened or shut and placed in any position desired or rendered necessary by the surface on which the instrument stands, and then by tightening the said nuts the blocks *i, i, i,* will be held firmly in place and by consequence each leg will be rigid and unmovable because each brace *f,* in connection with the pipe *c,* and leg *a,* forms a triangle that is rigidly connected at all its angles.

What I claim as my invention and desire to secure by Letters Patent is—

The combination of the braces (*f, f, f,*) and screw clamping blocks (*i, i, i,*) or their equivalents with the legs (*a,*) in substantially the manner and for the purposes specified.

In witness whereof I have hereunto set my signature this third day of March 1859.

HENRY J. LEWIS.

Witnesses:
LEMUEL W. SERRELL,
THOMAS G. HAROLD.